(12) United States Patent
Takagi et al.

(10) Patent No.: US 7,379,089 B2
(45) Date of Patent: May 27, 2008

(54) APPARATUS AND METHOD FOR MONITORING THE IMMEDIATE SURROUNDINGS OF A VEHICLE

(75) Inventors: Makoto Takagi, Toyota (JP); Motonori Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 727 days.

(21) Appl. No.: 10/732,315

(22) Filed: Dec. 11, 2003

(65) Prior Publication Data

US 2004/0119823 A1 Jun. 24, 2004

(30) Foreign Application Priority Data

Dec. 24, 2002 (JP) ............................. 2002-372447

(51) Int. Cl.
*H04N 7/18* (2006.01)
(52) U.S. Cl. ...................................... 348/148
(58) Field of Classification Search ................ 348/143, 348/148, 150, 222.1; *H04N 7/18*
See application file for complete search history.

(56) References Cited

U.S. PATENT DOCUMENTS

| | | | |
|---|---|---|---|
| 5,874,989 A * | 2/1999 | O'Brien et al. ............. | 348/148 |
| 6,008,841 A * | 12/1999 | Charlson ................... | 348/148 |
| 6,654,670 B2 * | 11/2003 | Kakinami et al. ............. | 701/1 |
| 6,912,001 B2 * | 6/2005 | Okamoto et al. ......... | 348/222.1 |
| 7,027,616 B2 * | 4/2006 | Ishii et al. ................... | 382/104 |
| 7,030,778 B2 * | 4/2006 | Ra .............................. | 340/937 |

FOREIGN PATENT DOCUMENTS

| | | |
|---|---|---|
| DE | 101 33 511 A1 | 1/2003 |
| EP | 0 700 212 A1 | 3/1996 |
| EP | 1 157 890 A1 | 11/2001 |
| JP | A-64-014700 | 1/1989 |
| JP | U-64-008447 | 1/1989 |
| JP | A 8-16999 | 1/1996 |
| JP | A-10-154279 | 6/1998 |
| JP | A-11-115546 | 4/1999 |
| JP | 11-124036 | 5/1999 |
| JP | A-2001-006097 | 1/2001 |
| JP | A-2001-150977 | 6/2001 |

* cited by examiner

*Primary Examiner*—Tung Vo
(74) *Attorney, Agent, or Firm*—Oliff & Berridge, PLC

(57) ABSTRACT

An apparatus for monitoring the immediate surroundings of a vehicle displays on a display within the vehicle cabin a captured image of the vehicle immediate surroundings captured by a camera mounted on a back door which can open and close. The apparatus determines whether the back door is open based on a signal output from a back door courtesy switch. If it is determined that the back door is open, a written notification that the back door is open is superimposed on the display showing the captured image from the camera. If it is determined that the back door is not open, the written notification is not shown.

11 Claims, 5 Drawing Sheets

APPARATUS AND METHOD FOR MONITORING THE IMMEDIATE SURROUNDINGS OF A VEHICLE

INCORPORATION BY REFERENCE

The disclosure of Japanese Patent Application No. 2002-372447 filed on Dec. 24, 2002, including the specification, drawings and abstract is incorporated herein by reference in its entirety.

BACKGROUND OF THE INVENTION

1. Field of the Invention

The invention relates to an apparatus and method for monitoring the immediate surroundings of a vehicle, and more particularly, to an apparatus and method for monitoring the immediate surroundings of a vehicle, which is provided with a camera mounted on a vehicle door able to open and close, and which displays a captured image of the vehicle immediate surroundings captured by the camera on a display.

2. Description of the Related Art

JP(A) 8-16999, for example, discloses an apparatus for monitoring the immediate surroundings of a vehicle which notifies the driver using warning means when a captured image of the vehicle immediate surroundings from a camera is off from a desired reference image. This apparatus uses as the desired reference image an image captured when a reference mounted on a fixed portion of the vehicle that is in the image area captured by the camera is in an initial position, and detects a change in position of that reference in the captured image. If it is determined that the position of the reference has changed from the initial position, the driver is notified. This apparatus therefore enables a situation to be avoided in which a vehicle occupant perceives the immediate surroundings of the vehicle erroneously due to a captured image that is improper because of the mounting position of the camera serving as the imaging device.

However, with cameras or the like mounted on a front portion and rear portion of the vehicle so as to capture areas to the front and rear of the vehicle, there may be cases in which a fixed portion of the vehicle is not in the image area captured by the camera, in which case it is difficult to establish an appropriate reference in the captured image area. With the apparatus of the foregoing publication, therefore, if the fixed portion of the vehicle is not included in the image area captured by the camera, it is not possible to detect whether the direction of image capture by the camera is off with respect to the desired direction. As a result, if the direction is off, the occupant may be led to have an erroneous perception of the immediate surroundings of the vehicle.

SUMMARY OF THE INVENTION

In view of the foregoing problems, this invention thus provides an apparatus and method for monitoring the immediate surroundings of a vehicle able to prevent an occupant from gaining an erroneous perception of the immediate surroundings of the vehicle due to the captured image by detecting whether the direction of image capture by the camera is off from a desired direction of image capture, even if a fixed portion of the vehicle is not within the image area captured by the camera.

A first aspect of the invention relates to an apparatus for monitoring the immediate surroundings of a vehicle, which is provided with i) an image capturing device mounted on a vehicle door which can open and close, ii) a display for providing an occupant of the vehicle with a captured image of the vehicle immediate surroundings captured by the image capturing device, iii) a door-open determining device which determines whether the vehicle door is not closed, and iv) a display controller which indicates on the display showing the captured image that the vehicle door is open when it has been detected by the door-open determining device that the vehicle door is not closed.

According to this first aspect of the invention, when the image capturing device (camera) mounted on the vehicle door is not pointed in a desired direction, the occupant viewing the captured image may be alerted to the fact that the image captured by the image capturing device is not a proper image. As a result, it is possible to prevent the occupant of the vehicle from gaining an erroneous perception of the immediate surroundings of the vehicle due to the captured image.

The display controller according to the first aspect of the invention may also display a written notification that the vehicle door is open superimposed on the captured image shown on the display. Accordingly, when the image capturing device mounted on the vehicle door is not pointing in the desired direction, the occupant of the vehicle is able to be alerted to that fact with characters.

The display controller according to the first aspect of the invention may also display a graphic image simulating the vehicle door in an open state superimposed on the captured image shown on the display. Accordingly, when the image capturing device mounted on the vehicle door is not pointing in the desired direction, the occupant of the vehicle is able to be alerted to that fact by the graphic display.

The display controller according to the first aspect of the invention may also give an indication that the captured image shown on the display is improper. Accordingly, the occupant of the vehicle is able to be alerted to the fact that the captured image from the image capturing device shown on the display is not a proper image when the image capturing device mounted on the vehicle door is not pointing in the desired direction.

The indication according to the first aspect of the invention may be given by at least one of turning off the image shown on the display, making the image shown on the display blink on and off, blurring the image shown on the display, and reducing the contrast of the image shown on the display. Accordingly, the occupant of the vehicle can be visually alerted to the fact that the captured image from the image capturing device shown on the display is not a proper image when the image capturing device mounted on the vehicle door is not pointing in the desired direction.

According to the first aspect of the invention, a guide line of when an optical axis of the image capturing device is pointing in the desired direction may be superimposed on the display showing the captured image. Accordingly, when the image capturing device mounted on the vehicle door is not pointing in the desired direction, the occupant of the vehicle can be visually alerted to the fact that the guide line shown on the display is off from the desired position on the image.

According to the first aspect of the invention, the vehicle door may be at least one of a back door and a side door.

According to the first aspect of the invention, the image capturing device may include a first camera which is mounted on the back door, and a second camera which is mounted on the side door. And the display may show the images from both the first camera and the second camera simultaneously.

According to the first aspect of the invention, the vehicle door may be a hood of a vehicle body front portion.

According to the first aspect of the invention, the image capturing device may be a camera.

A second aspect of the invention relates to an apparatus for monitoring the immediate surroundings of a vehicle, which is provided with i) a image capturing device mounted on a vehicle door which can open and close, ii) a display for providing an occupant of the vehicle with a captured image of the vehicle immediate surroundings captured by the image capturing device, iii) door-open determining means for determining whether the vehicle door is not closed, and iv) display controlling means for indicating on the display showing the captured image that the vehicle door is open when it has been detected by the door-open determining means that the vehicle door is not closed.

A third aspect of the invention relates to a method of monitoring the immediate surroundings of a vehicle in which is provided a image capturing device mounted on a vehicle door that can open and close, and in which is displayed, so as to be viewable by an occupant of the vehicle, a captured image of the immediate surroundings of the vehicle captured by the image capturing device, the method including the steps of (a) determining whether the vehicle door is not closed, and (b) when it is determined in step (a) that the vehicle door is not closed, showing the vehicle door in an open state on the display which shows the captured image.

BRIEF DESCRIPTION OF THE DRAWINGS

The foregoing and further objects, features, and advantages of the invention will be become apparent from the following description of the preferred embodiments with reference to the accompanying drawings, wherein like numerals are used to represent like elements and wherein.

DETAILED DESCRIPTION OF THE PREFERRED EMBODIMENTS

Figure 1:
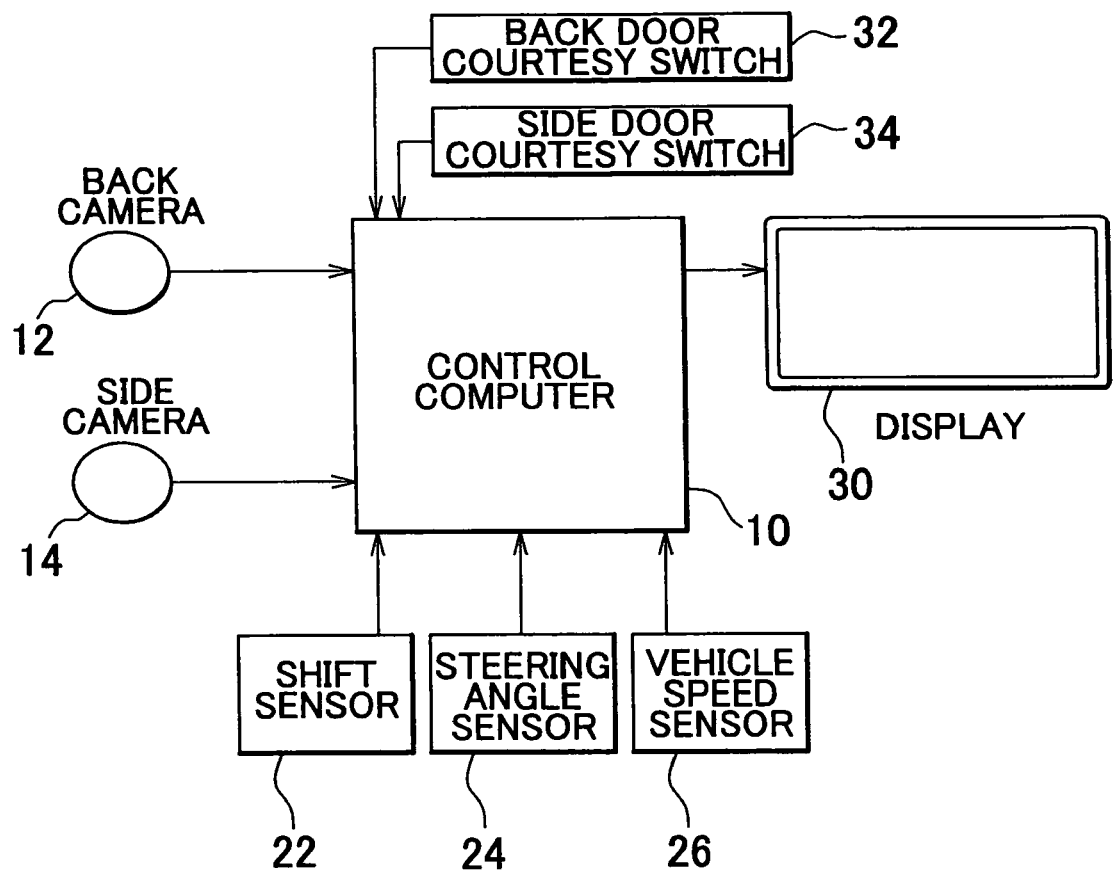
FIG. 1 is a system block diagram of an apparatus for monitoring the immediate surroundings of a vehicle according to a first exemplary embodiment of this invention.
Figure 2A:
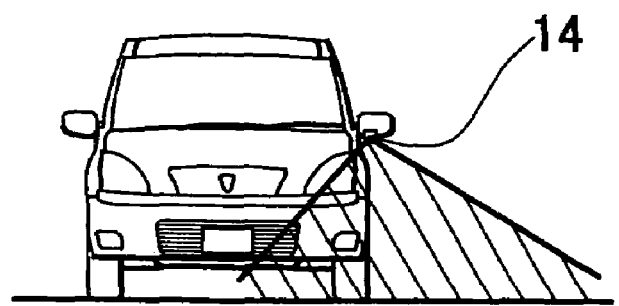
FIGS. 2A and 2B are views showing the mounting position and capture area of cameras of the apparatus for monitoring the immediate surroundings of a vehicle according to the exemplary embodiment, FIG. 2A being a front view and FIG. 2B being a side view.
Figure 2B:
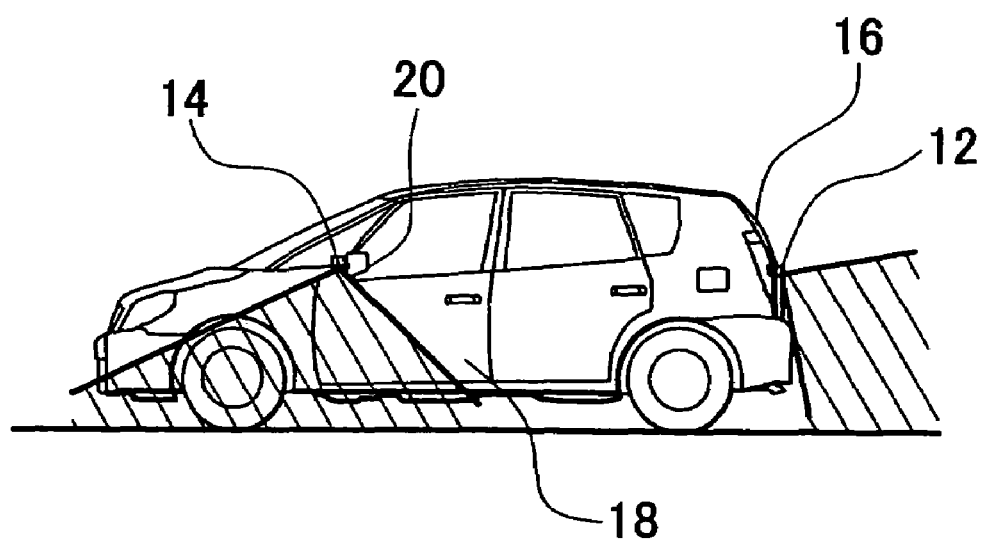

FIG. 1 is a system block diagram of an apparatus for monitoring the immediate surroundings of a vehicle according to a first exemplary embodiment of this invention. FIG. 2 is a view showing the mounting position and capture area of the cameras of the apparatus for monitoring the immediate surroundings of a vehicle according to the exemplary embodiment. The capture area of the each of the cameras is shown with diagonal lines in FIG. 2. FIG. 2A is a front view of the vehicle and FIG. 2B is a side view of the vehicle. The apparatus for monitoring the immediate surroundings of a vehicle according to the exemplary embodiment is mounted to the vehicle. This apparatus is provided with, and controlled by, a monitor electronic control computer (herein simply referred to as "control computer") 10.

To this control computer 10 are connected a back camera 12 and a side camera. The back camera 12 is mounted in the center of a back door 16, which is able to open and close, at a rear portion of the vehicle body. The back camera 12 has an optical axis which is pointed rearward from the rear portion of the vehicle body so as to capture a predetermined area that includes a blind spot of the driver that extends toward the rear. Further, the back door 16 is a so-called side-opening type door which opens and closes horizontally about a vertical axis. The back door 16 is not limited to this side-opening type, however. Alternatively, it may be a so-called clam shell type door or a lift-up type door or the like.

Also, the side camera 14 is mounted on a door mirror stay 20 which is in turn mounted on a side door 18, which can open and close, on the side opposite the side of the driver. Alternatively, however, the side camera 14 may also be mounted on a portion able to open and close other than the door mirror stay 20 of the side door 18. The side camera 14 has an optical axis which is pointed to the side and forward from the side portion of the vehicle body so as to capture a predetermined area that includes a blind spot of the driver that extends in that direction. Further, the side door 18 is a so-called side-opening type door which opens and closes horizontally about a vertical axis. The side door 18 is not limited to the side-opening type, however. Alternatively, it may be a sliding type door that slides in the fore-aft direction of the vehicle. The images from both the back camera 12 and the side camera 14 (herein referred to as "rear captured image" and "side captured image", respectively) are fed to the control computer 10.

To the control computer 10 are also connected a shift sensor 22, a steering angle sensor 24, and a vehicle speed sensor 26. The shift sensor 22 outputs a signal indicative of the shift position of a shift lever of a transmission in the vehicle. The steering sensor 24 outputs a signal indicative of a steering angle of the vehicle. The vehicle speed sensor 26 outputs a signal indicative of the vehicle speed. The signals output from these sensors 22 to 26 are supplied to the control computer 10. The control computer 10 then detects the shift position, steering angle, and vehicle speed based on those signals.

A display 30 is also connected to the control computer 10. This display 30 is a display for displaying an image and is mounted on the console or the like in the vehicle cabin in a location so as to be viewable by the driver. The control computer 10 selects one of the captured images from among the rear captured image taken from the back camera 12 and the side captured image taken from the side camera 14 when a display is requested by the driver or when the vehicle is in a predetermined running or operating state (e.g., when the shift lever is in a reverse position), and then controls the display 30 to show the selected captured image. When the rear captured image is shown on the display, that image is displayed with the right and left reversed from the actual image captured by the back camera 12 in order to improve visual recognition by the driver.

Also connected to the control computer 10 are a back door courtesy switch 32 and a side door courtesy switch 34. The back door courtesy switch 32 is a switch for turning a lamp inside the vehicle cabin on or off depending on whether the back door 16 is open or closed. Similarly, the side door courtesy switch 34 is a switch for turning a lamp inside the vehicle cabin on or off depending on whether the side door 18 is open or closed. Both of the courtesy switches 32 and 34 output an off signal when the vehicle doors 16 and 18 are completely closed, and an on signal when the vehicle doors 16 and 18 are not completely closed. The signals output from the courtesy switches 32 and 34 are supplied to the control computer 10. The control computer 10 then determines whether the back door 16 is not closed based on the signal output from the back door courtesy switch 32, as well as whether the side door 18 is not closed based on the signal output from the side door courtesy switch 34.

In the apparatus for monitoring the immediate surroundings of a vehicle according to this exemplary embodiment of the invention, the control computer 10 estimates a projected turning radius of the vehicle based on the steering angle and vehicle speed and the like detected with the steering angle sensor 24 and the vehicle speed sensor 26, and calculates i) a projected path (hereinafter referred to as the "inside projected path") that a portion of the vehicle body moving along the shortest radius (e.g., a rear wheel on the inside of the turn when the vehicle is moving in reverse) will actually take, ii) a projected path (hereinafter referred to as the "outside projected path") that a portion of the vehicle body moving along the longest radius (e.g., a front corner portion of the vehicle body on the outside of the turn) will actually take, and iii) two lines (hereinafter referred to as "distance reference lines") which are parallel in the width direction of the vehicle and set at predetermined distances (e.g., 50 cm and 1 m) from a rear end portion or front end portion of the vehicle body and located between the inside projected path and the outside projected path.

The control computer 10 also calculates the position on the captured image shown on the display 30 of i) a projected outside path of a turn (hereinafter referred to as the "widest path of travel") to the left and right that the vehicle would take if driven with the maximum allowable steering angle, and ii) lines (hereinafter referred to as "vehicle width lines") indicating the location of the sides of the vehicle body from the positional relationship between the vehicle and the optical axis in desired direction of the cameras 14 and 16 when the vehicle doors 16 and 18 are closed. Hereinafter, the term "guide lines" will be used when referring to the above paths and lines together.

In predetermined cases (such as when there has been a request from the driver to show the guide lines) when the rear captured image from the back camera 12 is being shown on the display 30, the control computer 10 displays the image while superimposing thereon the inside projected path, outside projected path, distance reference lines, widest path of travel, and vehicle width lines as guide lines. Similarly, in predetermined cases (such as when there has been a request from the driver to show the guide lines) when the side captured image from the side camera 14 is being shown on the display 30, the control computer 10 displays the image while superimposing thereon the inside projected path or the outside projected path and the vehicle width lines as guide lines. The paths and lines may also be displayed on the display 30 with each shown by a different shape or color or the like.

Accordingly, in the apparatus for monitoring the immediate surroundings of a vehicle according to this exemplary embodiment of the invention, the rear captured image from the back camera 12 can be displayed together with the guide lines on the display 30 when the vehicle is backing up, and the side captured image from the side camera 14 can be displayed together with the guide lines on the display 30 when the vehicle is turning. Therefore, when backing up to the rear where there is a large blind spot from the vantage point of the driver, namely, when turning to the side opposite the driver (e.g., a left turn when the steering wheel is on the right side of the vehicle), it is possible for the driver to grasp just how close the vehicle is to an obstacle to the rear or the side, i.e., the distance between the vehicle and the obstacle, with the display 30. Because the driver can visually confirm an object to the rear of the vehicle and to the side of the vehicle to the inside of a turn using the display 30, it is possible to keep the vehicle from contacting an obstacle.

Figure 3:
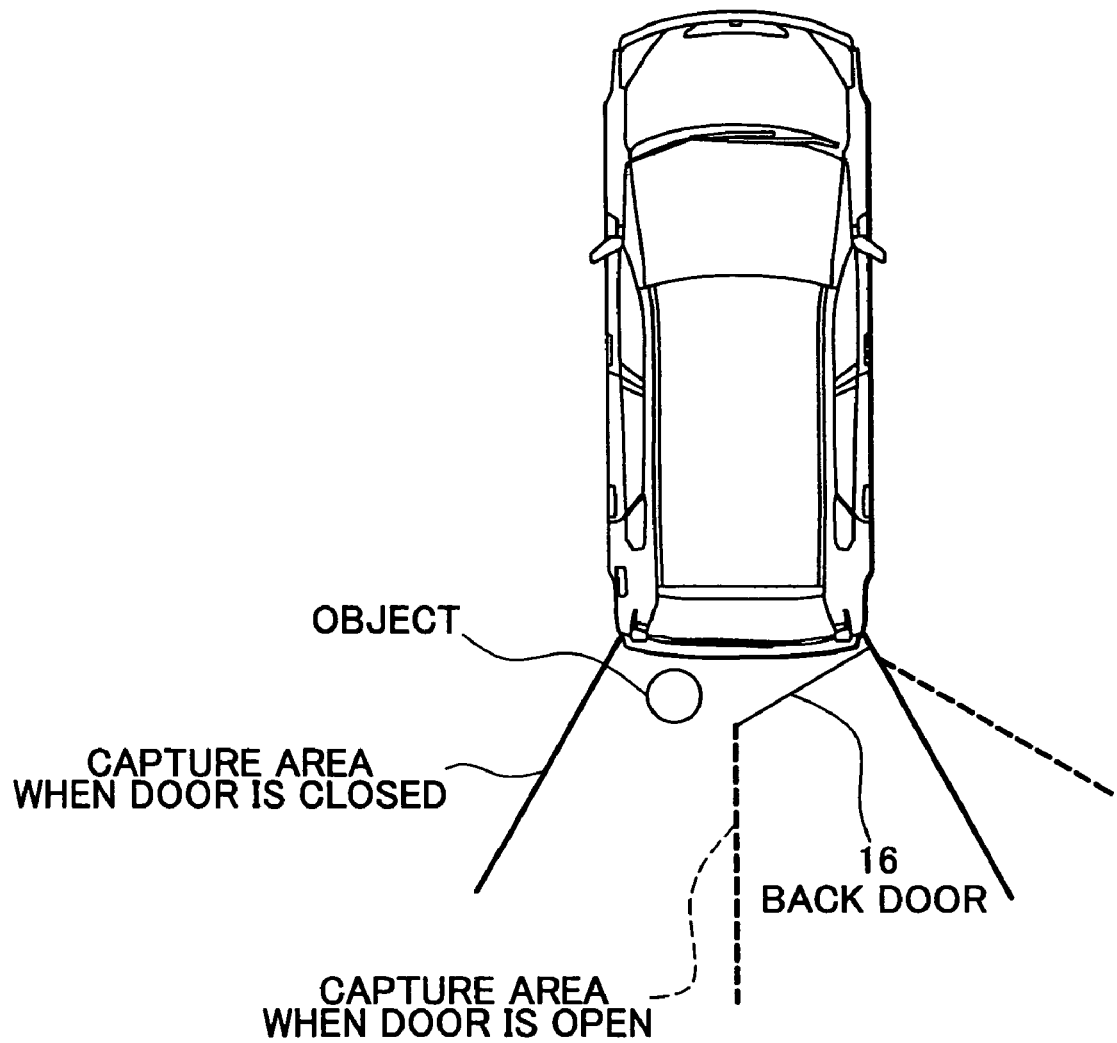
FIG. 3 is an explanatory view illustrating the difference in the capture area of one of the cameras when the vehicle door to which the camera of the apparatus for monitoring the immediate surroundings of a vehicle according to the exemplary embodiment is mounted is closed with respect to when that vehicle door is not closed.

FIG. 3 is an explanatory view illustrating the difference in the capture area of the back camera 12 of the apparatus for monitoring the immediate surroundings of a vehicle according to the exemplary embodiment when the back door 16 to which it is mounted is closed with respect to when the back door 16 is not completely closed. In the drawing, the area captured by the back camera 12 when the back door 16 is closed is shown outlined by solid lines, while the area captured by the back camera 12 when the back door 16 is not closed is shown outlined by broken lines.

In the exemplary embodiment, the back camera 12 is mounted on the back door 16, which is able to open and close, and the side camera 14 is mounted on the side door 18, which is also able to open and close, as described above. With this construction, when the vehicle is in the same spot and facing the same direction, the optical axes and captured areas of the cameras 12 and 14 when the vehicle doors 16 and 18 are closed are different than when the vehicle doors 16 and 18 are not closed, as shown in FIG. 3. As a result, the images captured by the cameras 12 and 14 when the vehicle doors 16 and 18 are closed are different than when the vehicle doors 16 and 18 are not closed. In this case, obstacles which should be in the captured images when the vehicle doors 16 and 18 are closed may not be in the captured images.

In particular, the guide lines are shown superimposed on the display 30 which shows the captured image. These guide lines, however, are based on the optical axis in the desired direction of the cameras 12 and 14 when the vehicle doors 16 and 18 are closed. Therefore, the guide lines shown on the display 30 when the vehicle doors 16 and 18 are not closed are not normal guide lines calculated from the vehicle specifications that are supposed to be outlined on the road, but rather guide lines that are off from the normal guide lines. As a result, if the driver drives the vehicle based on the image shown on the display 30, it will result in the driver gaining an erroneous perception of the immediate surroundings of the vehicle.

In order to avoid this problem, the apparatus for monitoring the immediate surroundings of a vehicle according to the exemplary embodiment has the characteristic of controlling the display on the display 30. Hereinafter, this characteristic portion of the exemplary embodiment will be described with reference to FIGS. 4 and 5.

Figure 4A:
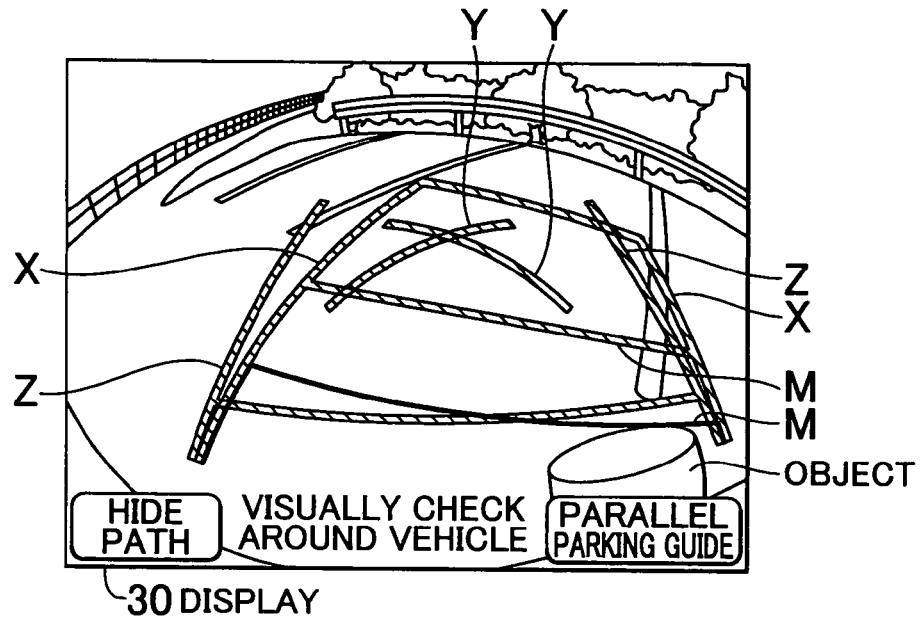
FIGS. 4A and 4B are explanatory views illustrating the difference of the image shown on the display when the vehicle door to which the camera of the apparatus for monitoring the immediate surroundings of a vehicle according to the exemplary embodiment is mounted is closed with respect to when that vehicle door is not closed, FIG. 4A illustrating a case in which the back door is closed and FIG. 4B illustrating a case in which the back door is not closed.
Figure 4B:
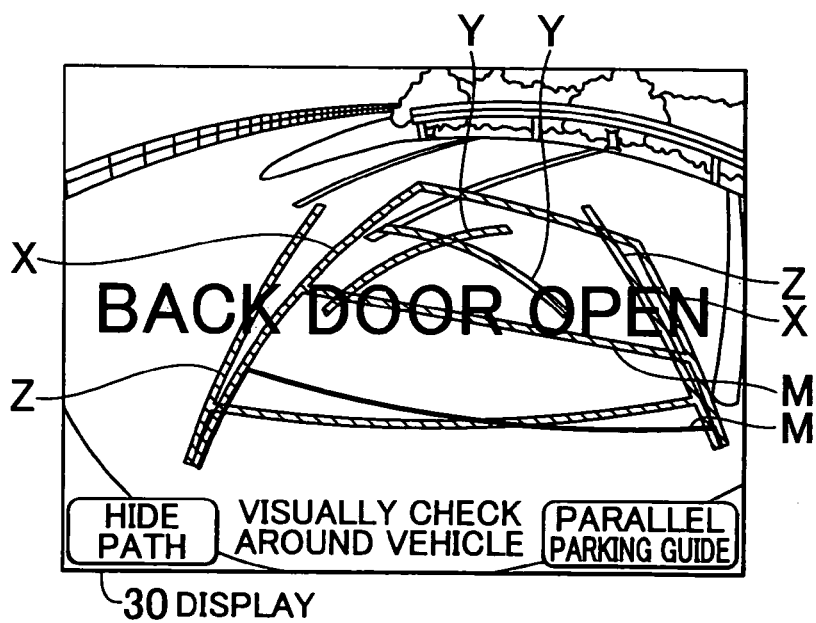

FIG. 4 is an explanatory view illustrating the difference of the image shown on the display 30 when the back door 16 to which the back camera 12 of the apparatus for monitoring the immediate surroundings of a vehicle according to the exemplary embodiment is mounted is closed with respect to when the back door 16 is not closed. FIG. 4A shows a case in which the back door 16 is closed, and FIG. 4B shows a case in which the back door 16 is not closed. In FIG. 4, the guide lines are shown represented by letters X, M, Y, and Z, where X denotes the projected path, M denotes the distance reference lines, Y denotes the widest path of travel, and Z denotes the vehicle width lines.

In the apparatus for monitoring the immediate surroundings of a vehicle according to the exemplary embodiment of the invention, when the rear captured image from the back camera 12 is shown on the display 30, the control computer 10 continues to show the rear captured image and the guide lines on the display 30, as shown in FIG. 4A, when the back door 16 is completely closed and the determination reflects that fact. On the other hand, when the back door 16 is not completely closed and the determination reflects that fact, the control computer 10 displays a written notification (warning) that the back door 16 is open superimposed on the display 30 which shows the rear captured image and the guide lines, as shown in FIG. 4B.

Similarly, when the side captured image from the side camera 14 is shown on the display 30, the control computer 10 continues to show the side captured image and the guide lines on the display 30 when the side door 18 is completely closed and the determination reflects that fact. On the other hand, when the side door 18 is not completely closed and the determination reflects that fact, the control computer 10 displays a written notification (warning) that the side door 18 is open superimposed on the display 30 which shows the side captured image and the guide lines.

According to this display process, when the vehicle doors 16 and 18 are not closed, including when they are not closed properly, it is possible to visually alert the driver, using characters, of the fact that the image captured by the cameras 12 and 14 displayed on the display 30 are not proper images. Accordingly in this case, it can be made clear to the driver of the vehicle that the guide lines shown on the display 30 are off from where they should be on the road. Further, it is possible to avoid the potential danger that may arise from the driver not being able to see an object when that object, which would be in the captured image if the vehicle doors 16 and 18 were closed, is not in that captured image due to the vehicle doors 16 and 18 not being closed. Therefore, this construction of the exemplary embodiment makes it possible to prevent the driver from gaining an erroneous perception of the immediate surroundings of the vehicle due to the captured image.

Figure 5:
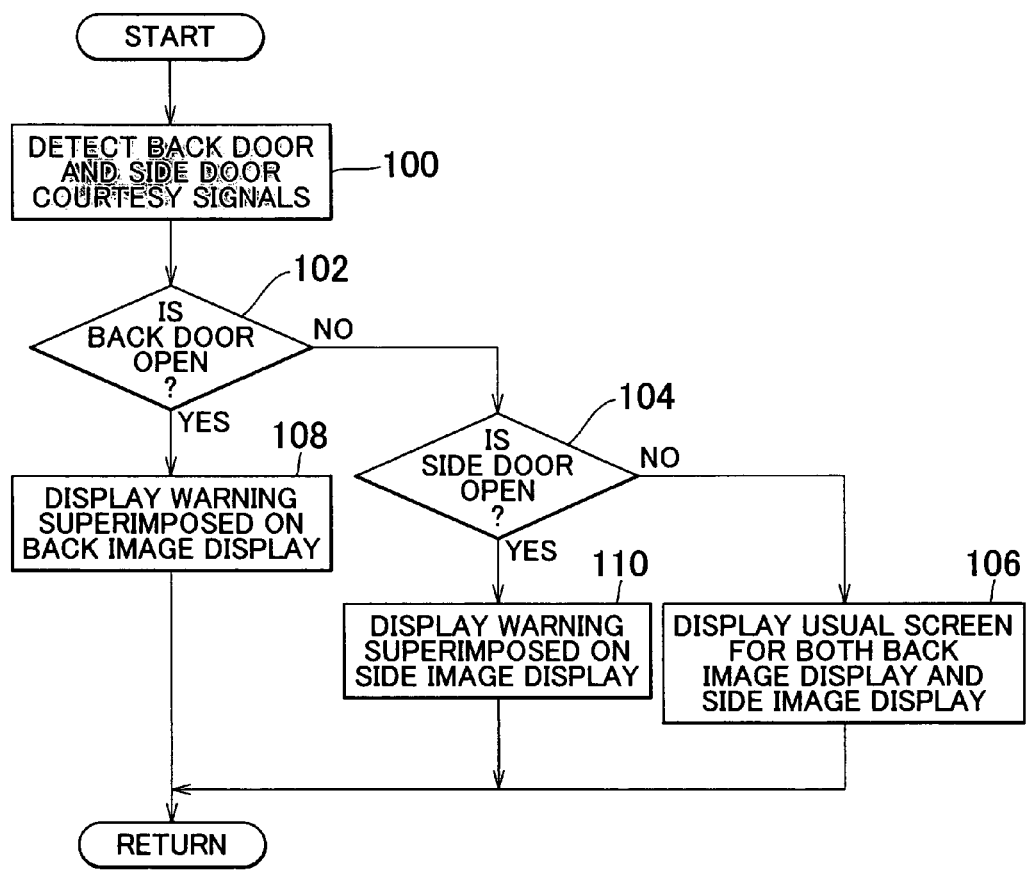
FIG. 5 is a flowchart illustrating a control routine executed in the apparatus for monitoring the immediate surroundings of a vehicle according to the exemplary embodiment of the invention.

FIG. 5 is a flowchart of one example of a control routine executed by the control computer 10 according to the exemplary embodiment in order to realize the foregoing function. The routine shown in the drawing is repeatedly started again each time after each it ends. The routine starts with step 100.

In step 100, a process is executed to detect the signals from the back door courtesy switch 32 and the side door courtesy switch 34. In step 102 it is determined whether the back door 16 is open based on the signal from the back door courtesy switch 32. When it has been determined due to the back door courtesy switch 32 outputting an off signal that the back door 16 is not open, i.e., when it has been determined that the back door 16 is completely closed, the routine proceeds on to step 104.

In step 104 it is determined whether the side door 18 is open based on the signal from the side door courtesy switch 34. When it has been determined due to the side door courtesy switch 34 outputting an off signal that the side door 18 is not open, i.e., when it has been determined that the side door 18 is completely closed, the routine proceeds on to step 106. In step 106, a process is executed to display the image captured by the back camera 12 or the image captured by the side camera 14 as usual on the display 30. When the process in step 106 ends, the current cycle of the routine ends.

When it is determined in step 102, on the other hand, that the back door 16 is open, which includes the case in which the back door 16 is not closed properly, due to the back door courtesy switch 32 outputting an on signal, it can be determined that the optical axis of the back camera 12 is off from the desired direction and the routine proceeds to step 108. In step 108, a process is executed for displaying a written warning indicating that the back door 16 is open superimposed on the display 30 showing the image captured by the back camera 12. When the process in step 108 ends, the current cycle of the routine ends.

Also, when it is determined in step 104 that the side door 18 is open, which includes the case in which the side door 18 is not closed properly, due to the side door courtesy switch 34 outputting an on signal, it can be determined that the optical axis of the side camera 14 is off from the desired direction and the routine proceeds to step 110. In step 110, a process is executed for displaying a written warning that the side door 18 is open superimposed on the display 30 showing the image captured by the side camera 14. When the process in step 110 ends, the current cycle of the routine ends.

According to the routine shown in FIG. 5, when the back door 16 is not closed, it is possible to display a written warning that the back door is open superimposed on the captured image on the display 30 when the image captured by the back camera 12 is shown on the display 30. Similarly, when the side door 18 is not closed, it is possible to display a written warning that the side door is open superimposed on the captured image on the display 30 when the image captured by the side camera 14 is shown on the display 30. On the other hand, when both the back door 16 and the side door 18 are closed, the images captured by the cameras 12 and 14 can be shown as usual on the display 30.

According to this process, when the back door 16 or the side door 18 is not closed, including the case in which the back door 16 or the side door 18 is not closed properly, it is detected the direction of the image taken by the back camera 12 or the side camera 14 is off (i.e., the optical axis is off) from the desired direction, and the driver can be visually alerted to the fact that the captured images from the cameras 12 and 14 are not proper images. Accordingly in this case, it can be made clear to the driver of the vehicle that the guide lines shown together with the captured images from the cameras 12 and 14 on the display 30 are off from where they should be on the road. While it is possible that the driver may not be able to see an object on the display when that object which would be in the captured image if the vehicle doors 16 and 18 were closed is not in that captured image due to the vehicle doors 16 and 18 not being closed, the driver in this case is made to comprehend the fact that that possibility exists, thus avoiding danger to the vehicle.

In this way, in the apparatus for monitoring the immediate surroundings of a vehicle according to the exemplary embodiment of the invention, when the image captured by the back camera 12 or the side camera 14 is shown on the display, it is possible to prevent the driver from gaining an erroneous perception of the immediate surroundings of the vehicle from the image on the display 30 due to the corresponding vehicle door 16 and 18, on which are mounted the cameras 12 and 14, being not closed. Further, according to the exemplary embodiment, the directional deviation from the desired direction of the optical axis of the cameras 12 and 14 mounted on the vehicle doors 16 and 18, which are able to open and close, is detected using the back door courtesy switch 32 and the side door courtesy switch 34. Accordingly, with the apparatus for monitoring the immediate surroundings of a vehicle according to this exemplary embodiment, it is possible to prevent the driver from gaining an erroneous perception of the immediate surroundings of the vehicle due to the captured image by detecting directional deviation of the cameras 12 and 14 without including a fixed portion of the vehicle in the captured image.

In this exemplary embodiment of the invention, the back door 16 and the side door 18 correspond to the "vehicle door" in the claims of this invention. Also in the claims, the back camera 12 and the side camera 14 correspond to the "camera", the display 30 corresponds to the "display", the execution by the control computer 10 of the processes in steps 102 and 104 in the routine shown in FIG. 5 corresponds to the "door-open determining device or means", and the execution by the control computer 10 of the processes in step 108 and 110 corresponds to the "display controller or means".

According to the exemplary embodiment of the invention, one of the captured images from among the rear captured image from the back camera 12 and the side captured image from the side camera 14 is selected and shown on the display 30. The invention is not limited to this construction, however. That is, both of the captured images may be shown simultaneously on the display 30.

Also according to the exemplary embodiment of the invention, when the back door 16 on which is mounted the back camera 12 or the side door on which is mounted the side camera 14 is not closed, a written notification that that vehicle door 16 or 18 is open is superimposed on the display 30 showing the captured image from the camera 12 or 14. The invention is not limited to this construction, however. That is, with a vehicle in which a front camera capturing an area extending to the front of the vehicle is mounted on a hood, which is able to open and close, at a front portion of the vehicle body, a written notification that the hood is open can also be superimposed on display 30 showing the image captured by the front camera when the hood of the vehicle is not closed.

Further, according to the exemplary embodiment of the invention, a written notification (i.e., a written warning) that the vehicle door 16 and 18 is open is superimposed on the display 30 showing the images captured by the cameras 14 and 16 to warn the driver that the vehicle door 16 and 18 is open. The invention is not limited to this construction, however. That is, a graphic image simulating the vehicle door 16 and 18 in an open state may also be superimposed on the display 30 showing the images captured by the cameras 12 and 14. In this case, the same effects obtained in the foregoing exemplary embodiment can also be obtained because the driver is visually alerted with a picture illustrating that the images captured by the cameras 12 and 14 shown on the display 30 are not proper images.

Also according to the exemplary embodiment, no processing is performed on the actual image itself that is shown on the display 30 showing the images captured from the cameras 12 and 14 as a warning that the vehicle doors 16 and 18 are open. The invention is not limited to this construction, however. That is, the actual image itself on the display 30 can be turned off, made to blink on and off, blurred, or the contrast of the image can be reduced. In these cases, the same effects obtained in the foregoing exemplary embodiment can also be obtained because the driver is visually alerted to the fact that the images captured by the cameras 12 and 14 shown on the display 30 are not proper images.

Also according to the exemplary embodiment, the guide lines are shown superimposed on the display 30 showing the images captured by the cameras 12 and 14. The invention is not limited to this construction, however. That is, the guide lines do not have to be superimposed so that only the images captured by the cameras 12 and 14 are shown on the display 30.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. An apparatus for monitoring the immediate surroundings of a vehicle comprising:
    a camera mounted on a back door or a side door that can open and close, such that a captured area of the camera is different when said back door or said side door is open than when said back door or said side door is closed;
    a display which indicates a captured image of the vehicle immediate surroundings captured by the camera, and which the occupant of the vehicle can visually check;
    a door-open determining device which determines whether the back door or the side door, on which the camera that captures the captured image indicated on the display is mounted, is unclosed based on a signal from a door courtesy switch; and
    a display controller that superimposes an indication that the back door or the side door is open on the captured image that is taken from the camera mounted on the open door indicated on the display, when the door-open determining device determines that the back door or the side door is unclosed.

2. The apparatus for monitoring the immediate surrounding of a vehicle according to claim 1, wherein
    the camera is mounted on each of the back door and the side door, and
    when the door-open determining device determines that the back door is unclosed, the display controller displays a written notification that the back door is open superimposed on the captured image indicated on the display, and when the door-open determining device determines that the side door is unclosed, the display controller displays a written notification that the side door is open superimposed on the captured image indicated on the display.

3. The apparatus for monitoring the immediate surroundings of a vehicle according to claim 1, wherein
    the camera is mounted on each of the back door and the side door, and
    when the door-open determining device determines that the back door is unclosed, the display controller displays a graphic image simulating the back door in an open state superimposed on the captured image indicated on the display, and when the door-open determining device determines that the side door is unclosed, the display controller displays a graphic image simulating the side door in an open state superimposed on the captured image indicated on the display.

4. The apparatus for monitoring the immediate surroundings of a vehicle according to claim 1, wherein
a guide line of when an optical axis of the camera is pointing in a desired direction in a case where the back door or the side door is unclosed is superimposed on the display indicating the captured image, and
when the door-open determining device determines that the back door or the side door is unclosed, the display controller superimposes an indication that the back door or the side door is open on the display in order to notify a driver of the vehicle of a fact that the guide line superimposed on the display deviates from a regular guide line.

5. The apparatus for monitoring the immediate surroundings of a vehicle according to claim 4, wherein
the guide line is an estimated path over which a vehicle body will actually run, a distance guide line that indicates a distance from an end portion of the vehicle body, a maximum movement path over which the vehicle is estimated to run when the vehicle moves at a maximum steering angle, or a vehicle width extended line that indicates an extended line of a vehicle width.

6. An apparatus for monitoring the immediate surroundings of a vehicle, comprising:
a camera mounted on a back door or a side door that can open and close, such that a captured area of the camera is different when said back door or said side door is open than when said back door or said side door is closed;
a display which indicates a captured image of the vehicle immediate surroundings captured by the camera, and which occupant of the vehicle can visually check;
a door-open determining means for determining whether the back door or the side door, on which the camera that captures the captured image indicated on the display is mounted, is unclosed based on a signal from a door courtesy switch; and
a display control means for superimposing an indication that the back door or the side door is open on the captured image that is taken from the camera mounted on the open door indicated on the display, when the door-open determining means determines that the back door or the side door is unclosed.

7. A method for monitoring the immediate surroundings of a vehicle, which includes a camera mounted on a back door or a side door that can open and close, such that a captured area of the camera is different when said back door or said side door is open than when said back door or said side door is closed; and a display which indicates a captured image of the vehicle immediate surroundings captured by the camera, and which the occupant of the vehicle can visually check, the method comprising:

determining whether the back door or the side door, on which the camera that captures the captured image indicated on the display is mounted, is unclosed based on a signal from a door courtesy switch; and
superimposing an indication that the back door or the side door is open on the captured image that is taken from the camera mounted on the open door indicated on the display, when it is determined that the backdoor or the side door is unclosed.

8. The method for monitoring the immediate surroundings of a vehicle according to claim 7, wherein
the camera is mounted on each of the back door and the side door, and
the method further includes, when it is determined that the back door is unclosed, displaying a written notification that the back door is open superimposed on the captured image indicated on the display, and when it is determined that the side door is unclosed, displaying a written notification that the side door is open superimposed on the captured image indicated on the display.

9. The method for monitoring the immediate surroundings of a vehicle according to claim 7, wherein
the camera is mounted on each of the back door and the side door, and
the method further includes, when it is determined that the back door is unclosed, displaying a graphic image simulating the back door in an open state superimposed on the captured image indicated on the display, and when it is determined that the side door is unclosed, displaying a graphic image simulating the side door in an open state superimposed on the captured image indicated on the display.

10. The method for monitoring the immediate surroundings of a vehicle according to claim 7, wherein
a guide line of when an optical axis of the camera is pointing in a desired direction in a case where the back door or the side door is unclosed is superimposed on the display indicating the captured image, and
the method further includes, when it is determined that the back door or the side door is unclosed, superimposing an indication that the back door or the side door is open on the display in order to notify a driver of the vehicle of a fact that the guide line superimposed on the display deviates from a regular guide line.

11. The method for monitoring the immediate surroundings of a vehicle according to claim 10, wherein
the guide line is an estimated path over which a vehicle body will actually run, a distance guide line that indicates a distance from an end portion of the vehicle body, a maximum movement path over which the vehicle is estimated to run when the vehicle moves at a maximum steering angle, or a vehicle width extended line that indicates an extended line of a vehicle width.

* * * * *